L. SMITH.
Apparatus for Making Extracts.

No. 48,107.

Patented June 6, 1865.

UNITED STATES PATENT OFFICE.

LYMAN SMITH, OF ERIE, PENNSYLVANIA.

IMPROVED APPARATUS FOR MAKING EXTRACTS.

Specification forming part of Letters Patent No. 48,107, dated June 6, 1865.

*To all whom it may concern:*

Be it known that I, LYMAN SMITH, of Erie, in the county of Erie and State of Pennsylvania, have invented a new and Improved Apparatus for Making Extracts; and I do hereby declare that the following is a full, clear, and exact description thereof, which will enable others skilled in the art to make and use the same, reference being had to the accompanying drawings, forming part of this specification, in which—

Figure 1:
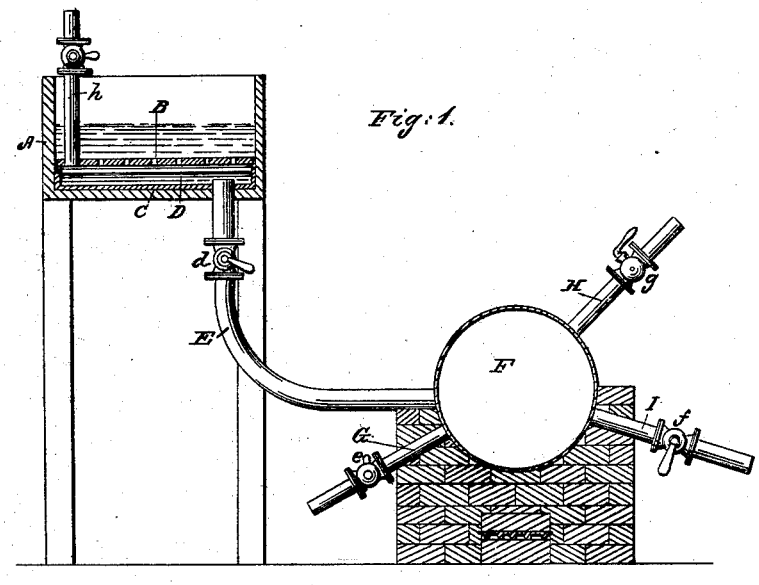
Figure 2:
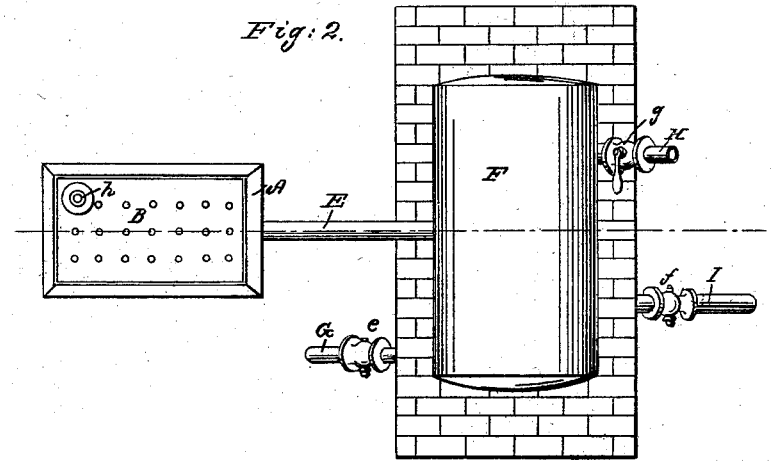

Figure 1 represents a transverse vertical section of this invention. Fig. 2 is a plan or top view of the same.

Similar letters of reference indicate like parts.

This invention relates to an apparatus which is particularly intended for extracting oil from paraffine, but which can be used for making extracts of any other material.

The invention consists in a tank with a perforated bottom and trough, from which a tube extends downward in a vacuum-pan, in which a vacuum is produced by the condensation of steam or by any other suitable means in such a manner that by opening or closing the requisite faucets or stop-cocks the operation of making the extract can be considerably facilitated by the atmospheric pressure, which is caused to act on the material to be extracted, and much time and labor is saved.

A represents a tank with a false perforated bottom, B, on which the material to be extracted is placed. The space between the false bottom B and the real bottom C forms a trough, D, which communicates by a pipe, E, with the vacuum-pan F. This pan consists of a vessel made of sheet metal or any other suitable material in the form of a cylinder, or in any convenient form or shape, and it connects by a pipe, G, with a steam-generator or other source from which steam can be drawn, and another pipe, H, extends from its top. I is the liquid-discharge pipe. These several pipes are provided with stop-cocks $d\,e\,f\,g$, as clearly shown in the drawings. When all those cocks are closed, except the stop-cock $e$ in the steam-pipe, the pan F fills with steam, and the air contained in the pipe may be allowed to escape through the cock $g$ or through either of the other cocks. The cocks are then closed, and the steam in the pan is allowed to condense. By these means a vacuum is formed in said pan, and if the stop-cock $d$ is opened the atmospheric pressure is brought to bear on the material to be extracted, which, being spread on the perforated bottom B in the tank, precludes the atmospheric air from passing freely to the pipe E. The liquor extracted from the material in the tank passes through the pipe E into the pan F, and if a sufficient quantity of liquid has accumulated therein it is drawn off through the pipe I.

In order to expel the air from the trough D under the false bottom B, an air-pipe, $h$, is applied, as shown in the drawings. Through this pipe said trough may be filled with liquid, which will drive out the air, or the air may be removed by any other suitable means.

For the purpose of creating a vacuum in the tank F, other means may be employed besides the condensation of steam, and I do not wish to restrict myself to this particular method of effecting said object; but I reserve the right to change this portion of my process as circumstances may make it desirable; or the vacuum-pan might be dispensed with altogether, and a vacuum produced in the trough D by the direct application of an air-pump.

I claim as new and desire to secure by Letters Patent—

The combination, with the tank A, of a vacuum-pan, F, or other equivalent device for producing a vacuum, substantially as and for the purpose set forth.

LYMAN SMITH.

Witnesses:
   M. M. LIVINGSTON,
   C. L. TOPLIFF.